US012612796B2

(12) United States Patent
Reese

(10) Patent No.: US 12,612,796 B2

(45) Date of Patent: Apr. 28, 2026

(54) DEVICE AND METHOD FOR TRANSFERRING HANDICAPPED OR DISABLED PERSONS INTO OR OUT OF A SWIMMING POOL

(71) Applicant: Timothy Allen Reese, Johnstown, PA (US)

(72) Inventor: Timothy Allen Reese, Johnstown, PA (US)

(73) Assignee: Timothy A. Reese, Johnstown, PA (US)

( * ) Notice: Subject to any disclaimer, the term of this patent is extended or adjusted under 35 U.S.C. 154(b) by 136 days.

(21) Appl. No.: 18/815,275

(22) Filed: Aug. 26, 2024

(65) Prior Publication Data

US 2025/0067073 A1 Feb. 27, 2025

Related U.S. Application Data

(60) Provisional application No. 63/578,790, filed on Aug. 25, 2023.

(51) Int. Cl.
*E04H 4/14* (2006.01)
*A61G 5/10* (2006.01)

(52) U.S. Cl.
CPC ............. *E04H 4/144* (2013.01); *A61G 5/104* (2013.01)

(58) Field of Classification Search
CPC .......... E04H 4/144; A61G 5/104; A61G 7/10; A61G 7/1001; A61G 7/1005
USPC ........................................ 4/496, 560.1–564.1
See application file for complete search history.

(56) References Cited

U.S. PATENT DOCUMENTS

| | | | |
|---|---|---|---|
| 4,141,089 A | 2/1979 | Krumbeck | |
| 4,183,106 A | 1/1980 | Grimes et al. | |
| D283,168 S | 3/1986 | Daly | |
| 4,630,709 A | 12/1986 | Taylor | |
| 5,353,446 A | 10/1994 | Baranowski | |
| 5,509,639 A | 4/1996 | Ellis | |
| 5,685,030 A | 11/1997 | Baranowski | |
| 6,138,991 A * | 10/2000 | Myers, Jr. | B66C 23/44 212/180 |
| 6,616,396 B2 | 9/2003 | Sternberg | |
| 6,695,565 B1 | 2/2004 | Franchuk | |
| 6,698,994 B2 | 3/2004 | Barrett | |
| 7,197,775 B2 | 4/2007 | Steadman | |
| 7,407,149 B1 | 8/2008 | Zindell | |

(Continued)

FOREIGN PATENT DOCUMENTS

JP 2005329002 A * 12/2005

*Primary Examiner* — Tuan N Nguyen

(57) ABSTRACT

A device for assisting users to enter a pool and a method of use are provided. The device includes a pulley system, a mobile chair, and a ramp. The pulley system includes a base and post configured to support the system. A winch with a cable disposed thereon, and at least one pulley wheel configured to guide the cable is provided. The cable, or rope includes a fastener which can attach to the mobile chair for lowering/raising the chair utilizing the pulley system. The ramp is secured to the ground at one end and placed into a pool at the other end and is configured to allow controlled entry/removal of the mobile chair into the pool when attached to the cable. In operation, a user is placed into the mobile chair which is attached to the pulley system and lowered/raised by actuation of the winch of the pulley system.

8 Claims, 4 Drawing Sheets

(56) References Cited

U.S. PATENT DOCUMENTS

| | | | |
|---|---|---|---|
| 8,857,844 B1 | 10/2014 | Weber et al. |
| 9,944,360 B2 | 4/2018 | Franklin |
| 2014/0289953 A1 | 10/2014 | Steinman et al. |
| 2016/0120722 A1 | 5/2016 | Mueller |
| 2020/0129354 A1 | 4/2020 | Ioannou |
| 2022/0160563 A1 | 5/2022 | Wright et al. |

* cited by examiner

DEVICE AND METHOD FOR TRANSFERRING HANDICAPPED OR DISABLED PERSONS INTO OR OUT OF A SWIMMING POOL

CROSS-REFERENCE TO RELATED APPLICATION

This application claims the benefit of priority of U.S. provisional application No. 63/578,790, filed Aug. 25, 2023, the contents of which are herein incorporated by reference.

BACKGROUND OF THE INVENTION

Field of Invention

The present invention relates to swimming pools and, more particularly, to a device and method for transferring handicapped or disabled persons into or out of a swimming pool.

Description of Related Art

Swimming or relaxing in a swimming pool is an activity enjoyed by millions of people all year round. For many handicapped, mobility impaired, or disabled people, swimming pools are popular locations for therapy and exercise. However, many conventional swimming pools, particularly private swimming pools, are not accessible for handicapped, mobility impaired, or disabled people, such as those who require use of a wheelchair. Current solutions to this issue involve large, bulky, and non-portable lift devices that require handicapped, mobility impaired, or disabled individuals to be transferred from their wheelchair into a lift specific seat or sling. Conventional lift devices also use electricity and must be carefully, and often expensively, insulated and installed to avoid the device experiencing technical issues from water ingress or potentially harmful electrocutions for users.

As can be seen, there is a need for a device and method for handicapped, mobility impaired, or disabled people, into or out of a swimming pool that is easy to use, portable, does not require electricity, and does not require transferring a handicapped, mobility impaired, or disabled person out of their wheelchair.

The present invention solves these issues by providing a portable, easy to use, non-electrical device and method for transferring handicapped, mobility impaired, or disabled people, into or out of a swimming pool without the need to transfer the handicapped, mobility impaired, or disabled people out of their respective wheelchair. The present invention thus provides a device and method that is easy to install, less expensive than conventional lift devices, and grants more people the ability to access almost any pool, whether public or private.

SUMMARY OF THE INVENTION

In one aspect of the present invention, a device for assisting users with mobility impairments to enter a pool is provided. The system includes a pulley system, a mobile chair, and a ramp. The pulley system includes a base and a post affixed to the base, both of which are configured to provide stability and support to the system. A winch with a cable disposed thereon and at least one pulley wheel is affixed to the post and are configured to move and guide the cable during actuation of the winch. The cable includes a fastener, such as a hook or clasp disposed on one end and configured to attach to a portion of the mobile chair.

The mobile chair includes a frame, with a seat affixed to the frame, and a plurality of wheels affixed to the frame. The frame of the mobile chair includes an attachment mechanism such as an eyebolt, which is configured to attach to the fastener of the cable. The mobile chair can be made from materials to prevent weathering. The ramp includes a body, a front lip portion, and a plurality of guide rails. The front lip portion can be a plurality of flanges angled at a reflex angle from the body and configured to attach the ramp to the ground, or a deck of the pool. The plurality of guide rails are disposed opposite each other and run the length of the body. The plurality of guide rails protrude at normally to the top surface of the body of the ramp and are configured to prevent mobile chair from falling off of the ramp.

In another aspect of the present invention, is a method of operation and use of the device. IN operation the ramp is affixed to the ground or decking of the pool at the tip portion and then into the water such that the first end is placed securely on pool deck and the second end is placed securely on the floor of the pool, or in the alterative such that the lift affixed to the second end is placed securely on the floor of the pool. Additionally, the pulley system through the base is affixed, or otherwise secured, to pool deck 38.

Once the base and ramp are secured, the cable can be fastened to the mobile chair by connecting the fastener to the attachment mechanism. At this point, a first operator may then guide the wheelchair and its occupant onto the ramp and a second operator may actuate winch to lower the wheelchair into the pool by turning winch, via the handle, to extend the cable. The first operator may guide the wheelchair down the ramp with the aid of the guide rails. Further, the second operator may stand on the base while operating the winch to use their weight to further stabilize the lift during operation, however this is optional as based can be secured by other means. Once the wheelchair is submerged in the water to a sufficient degree, the occupant may exit the wheelchair into the water, with or without assistance from the first operator.

To pull the wheelchair out of the pool, the attachment mechanism may again be attached to the fastener on the free end of the cable and the wheelchair may be guided onto the portion of the ramp that is submerged, and the winch may be turned by the second operator to retract the cable. The first operator may again help guide the wheelchair and its occupant along the ramp with the aid of the ramp's guide rails.

These and other features, aspects and advantages of the present invention will become better understood with reference to the following drawings, description, and claims.

DETAILED DESCRIPTION OF THE INVENTION

Figure 1:
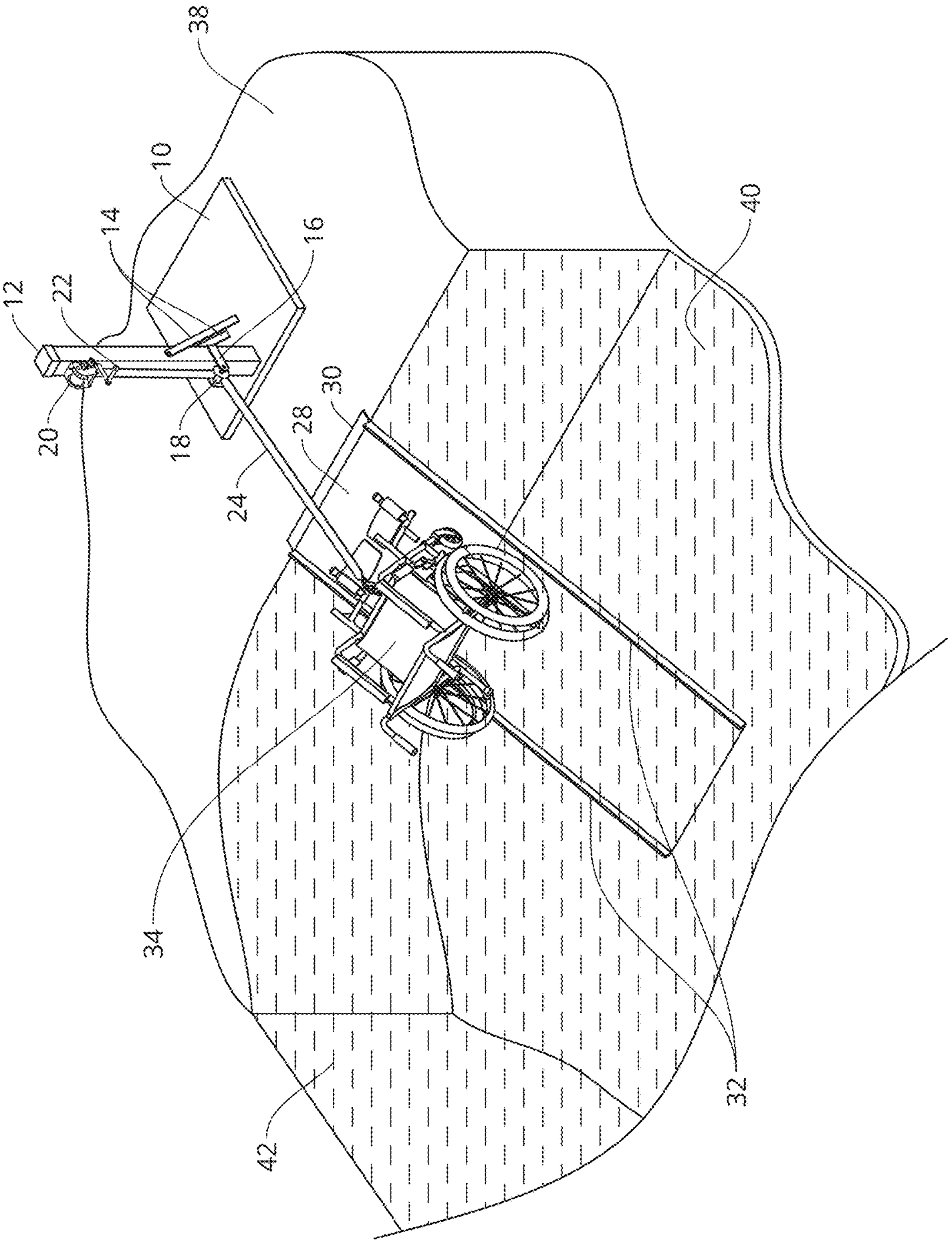
FIG. 1 shows an embodiment of a lift device, in use, in accordance with the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a device and method for transferring handicapped, mobility impaired, or disabled persons into or out of a swimming pool. The device comprises a lift, a ramp, and a wheelchair.

The lift comprises a base having a post extending upwardly therefrom, a pulley wheel attached to a lower portion of the post above the base, and a winch attached to an upper portion of the post above the pulley wheel and base. The winch comprises a winch wheel and hand crank configured to be spun and drive the winch wheel to retract or extend a rope or cable wrapped around the winch wheel. A free end of the rope or cable is run through the pulley wheel and has a hook or clasp attached to allow the cable to be coupled to the wheelchair.

The wheelchair comprises a chair, at least one set of large rear wheels, at least one set of small front wheels, and an attachment mechanism, such as a front eyebolt, attached to the chair. The attachment mechanism is configured to attach to the hook or clasp on the free end of the cable or rope such that the lift may be used to lower or raise the wheelchair into or out of the pool, respectively. The ramp includes a first end, a second end, and guide rails on opposing sides of the ramp. The first end of the ramp may be placed on an edge of the pool, while the second end of the ramp may be placed on a floor of the pool.

Broadly, the method comprises placing the ramp in the pool such that the first end is placed securely on an edge of the pool (clamps may be placed at each side of the top end attaching firmly to the pool side) and the second end is placed securely on the floor of the pool. The eyebolt of the wheelchair may then be connected to the hook or clasp on the free end of the cable or rope. The wheelchair may then be guided onto the ramp and the lift may be used to lower the wheelchair into the pool by a user turning the winch to extend the cable or rope. To pull the wheelchair out of the pool, the eyebolt may again be attached to the hook or clasp on the free end of the cable or rope, the wheelchair may be guided onto the second end of the ramp, and the winch may be turned to retract the cable or rope.

The present invention thus provides an easy to use and electricity free portable device and method for transferring handicapped or disabled persons into or out of a swimming pool. By doing so, the present invention grants more people greater access to swimming pools at a fraction of the cost of conventional lift systems.

Referring now to the Figures, an embodiment of the device and method of the present invention is shown. Specifically, an embodiment of the device and a method of use are illustrated.

Figure 2:
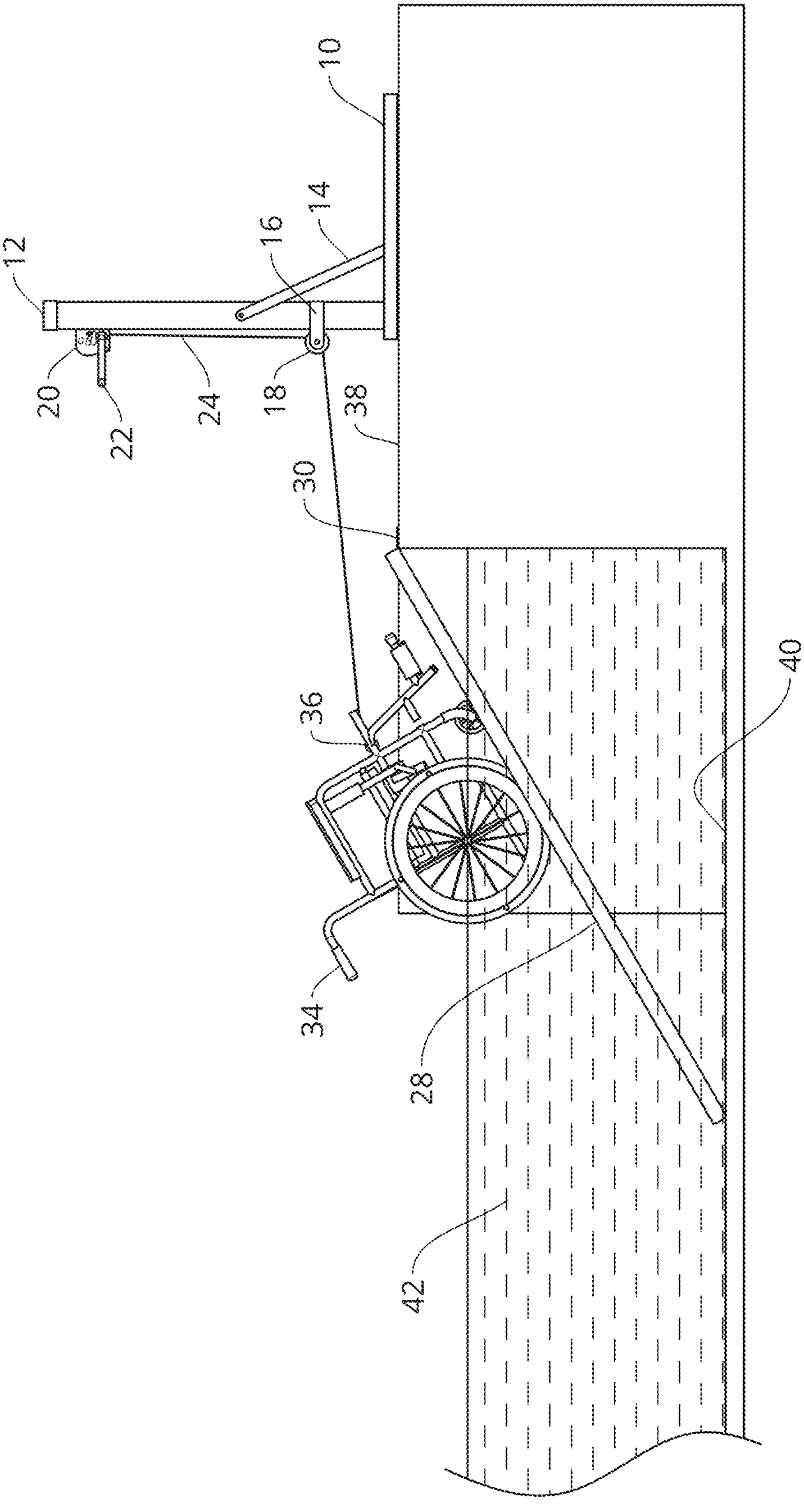
FIG. 2 is a side view thereof, shown in use.

Referring now to FIGS. 1-2, aspects of the present invention including a lift, a ramp 28, and a wheelchair 34 are illustrated. The lift can include a base 10 anchored to a surface 38, such as a pool deck, to prevent the lift from moving during operation. The lift can include a pulley mechanism for lowering/raising a user from water 42, for example in a pool. The pulley mechanism can include a post 12 mounted to a first surface of base 10, by one or more mounting mechanisms, e.g. nuts, bolts, screws, welds, etc. Additionally, post 12 can include a plurality of additional supports 14 affixed to the first surface of base 10 and to differing surfaces of post 12. The Pulley mechanism can include a pulley guide 18, such as a pulley wheel, mounted to post 12 by a pulley bracket 16 and configured to rotate freely about an axis perpendicular to post 12. The pulley mechanism can include a winch 20 with winch handle 22 configured to rotate winch 20 when actuation by a user. Winch 20 can be mounted to a first surface of post 12 proximate to an end of post 12 opposite of an end of post 12 mounted to the first surface of base 10. A rope 24, or cable, is wrapped around winch 20, with a free end of the rope 24, or cable, being run along a portion of the pulley guide 18 proximal to the post and base. The free end of the rope 24, or cable, is coupled to a fastening element, such as a hook or clasp.

Wheelchair 34 comprises a chair, at least one set of large rear wheels, at least one set of small front wheels, and an attachment mechanism 36 (described further below) attached to the chair. The chair includes a frame, a back portion, and a seat portion. The frame holds the back portion and the seat portion in position to hold a person, and lower portions of the frame coupled to the at least one set of large rear wheels and the at least one set of small front wheels. Adjacent the seat portion, a front portion of the frame is connected to a front eyebolt. Attachment mechanism 36 is configured to attach to the hook or clasp on the free end of the cable 24, or rope, such that the lift may be used to lower or raise the wheelchair into or out of water 42, respectively.

Ramp 28 includes a front lip 30, a second end, and guide rails 32 on opposing sides of the ramp. Front lip 30 of the ramp may be placed on an edge of the pool deck 38, while the second end of the ramp may be placed on a floor of the pool 40. To provide protection against chemicals present in the swimming pool and to provide more friction between the ramp and the pool edge and floor, ramp 28 may include a friction-providing polymer coating.

Figure 3:
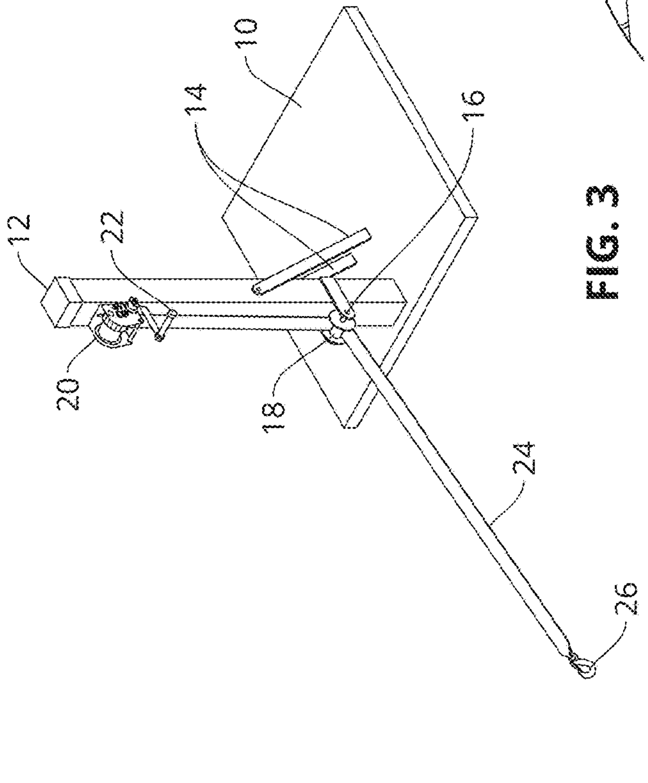
FIG. 3 is a detailed perspective view of the pool deck portion of the lift device.

Referring now to FIG. 3, further aspects of the lift are illustrated. As described above, the lift can include a plurality of components including a base, a post, and a pulley mechanism. In embodiments, base 10 can be substantially shaped as a rectangular prism with a top surface, a bottom surface, and four side surfaces, but other shapes are contemplated as being within the scope of the invention. In embodiments, base 10 can include a plurality of feet configured to prevent slippage, such as rubber, or other friction inducing material, disposed on at each corner of the bottom surface of base 10 and in contact with the ground. In embodiments, top surface of base 10 can include a recessed portion disposed therein, the negative space shaped as a rectangular prism, or cuboid, configured to accept post 12 for mounting. In embodiments, base 10 can include at least one aperture disposed through the top surface and the bottom surface. The at least one aperture can include an anchoring mechanism, such as a spike, bolt and washer, etc., configured to anchor base 10 to the ground. In embodiments, base 10 can be formed from any material suitable for use in outdoor applications, such as aluminum, wood, steel, etc. In embodiments base 10 can dimensioned to allow a user to stand on base 10. Advantageously, base 10 can provide structure and support for the present invention, preventing the lift from tipping or otherwise moving during operation.

In embodiments, post 12 can be substantially shaped as a rectangular prism with a top surface, a bottom surface, and four side surfaces, but other shapes, such as tubular shapes, are contemplated as being within the scope of the invention. In embodiments, post 12 can be formed from any material suitable for use in outdoor applications, such as aluminum, wood, steel, etc, and can include dimensions sufficient to provide support and mechanical advantage to the pulley system. In an exemplary embodiment, post 12 can be a 4×4 inch aluminum tube. In embodiments, the bottom surface of post 12 can be installed within the recessed portion of base 10 and can be affixed thereto by one or more attachment mechanisms known in the art, e.g. nut, bolts, screws, welds, etc. In embodiments, when installed post 12 can be perpendicular to base 10. Additionally, post 12 can be secured to base 10 by a plurality of additional supports 14. In embodiments, a first end of a first additional support 14 is affixed to a first side surface of post 12, and a first end of a second additional support 14 is affixed to a second side surface of post 12, while a second of both the first additional support 14 and the second additional support 14 are affixed to base 10. In embodiments, additional supports 14 can be affixed to post 12 and base 10 utilizing one or more attachment mechanisms known in the art, e.g. nut, bolts, screws, welds, etc.

In embodiments, a pulley system is provided and disposed on post 12. The pulley system includes a pulley wheel 18 mounted to a third side surface of post 12, via a pulley bracket 16, between the interface of base 10 and post 12 and the mounting points of the first additional support 14 and the second additional support 14 on post 12. In embodiments, pulley wheel 18 is attached such that it may freely rotate around an axis perpendicular to post 12. Winch 20 is mounted the third side surface of post 12 proximate to the top surface of post 12. In embodiments, winch 20 comprises a winch bracket, a winch wheel having a winch wheel rod, winch wheel hub, and winch wheel gear, and a hand crank having a hand crank rod, hand crank gear, hand crank arm, and hand crank handle 22. A winch bracket is coupled to post 12 and is rotatably coupled to the winch wheel rod and the hand crank rod. The winch wheel hub and winch wheel gear are placed adjacent to one another and fixed to the winch wheel rod such that the winch wheel hub and winch wheel gear spin with the winch wheel rod. The hand crank gear and a first end of the hand crank arm are secured to the hand crank rod with a portion of the bracket between the hand crank gear and hand crank arm. The hand crank gear is placed such that it engages with the winch wheel gear to allow the rotation of the hand crank arm to spin the winch wheel. The hand crank handle 22 is attached to a second end of the hand crank arm, distal from the first end of the hand crank arm to provide a lever arm of sufficient length to easily rotate the hand crank.

A rope 34, or cable, is wrapped around the winch wheel hub, with a free end of the rope or cable being run along a portion of the pulley wheel proximal to the post and base. The free end of the rope or cable is coupled to a fastening element 26, such as a hook or clasp. In embodiments, the fastening element 26 can attach to fastening mechanism 36 to raise/lower wheelchair 34 into/out of water 42.

Figure 4:
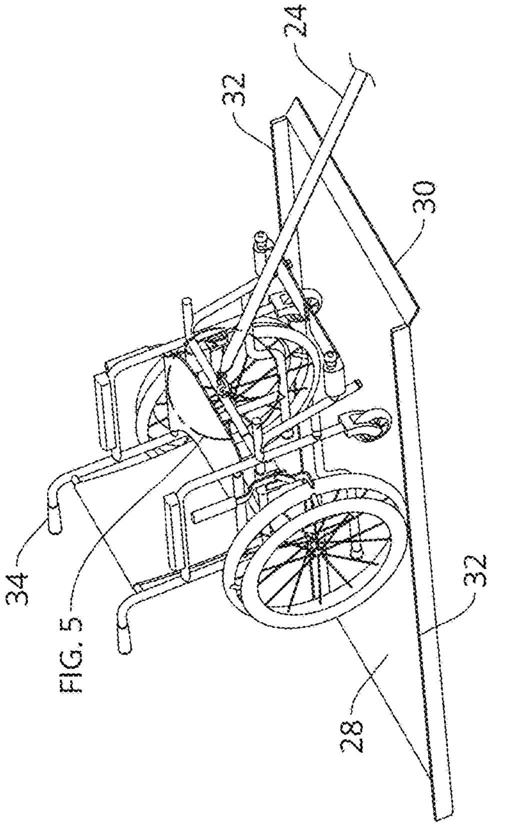
FIG. 4 is a detailed perspective view of the ramp and strap attachment of the lift device.

Referring now to FIG. 4, aspects of the wheelchair and ramp are illustrated. In embodiments, ramp 28 can include a front lip 30, a body, and a plurality of rails 32. In embodiments, body of ramp 28 can be substantially shaped as a rectangular prism with a top surface, a bottom surface, a front side surface, a back side surface and two side surfaces, but other shapes are contemplated as being within the scope of the invention. Front lip 30 can be affixed to body of ramp 28 and can include a plurality of flanges, disposed at an angle from the body, and configured to securely attach to pool deck 38. In embodiments, each of the plurality of flanges can include at least one aperture therethrough, and at least one attachment mechanism securely affixed to the flange and configured to secure the flange to pool deck 38 when disposed through each of the at least one aperture. In an exemplary embodiment, a pin, bolt, screw, etc., as the at least one attachment mechanism, can be secured at one end to the flange by a string, chain, rope, etc., such that it does not become lost when not in use. In the exemplary embodiment, the at least one attachment mechanism can be disposed through the aperture of the flange and secure to pool deck 38. Ramp 28 can include a plurality of rails 32 configured to prevent wheelchair 34 from falling off ramp 28. In embodiments, each of the plurality of rails 32 can be affixed to each of the two side surfaces of ramp 28. In embodiments, back side surface of ramp 28 can contact pool bottom 40. In an alternative embodiment, a lift (not illustrated) can be affixed to back side surface of ramp 28 and can be configured to raise the back side surface of ramp 28 such that it is not in contact with pool bottom 40. In an example of this alternative embodiment, the lift may raise the base side surface 2 feet, providing a user the ability to easily exit wheelchair 34.

Wheelchair 34 comprises a chair, at least one set of large rear wheels, at least one set of small front wheels, and an attachment mechanism 36 attached to the chair. The chair includes a frame, a back portion, and a seat portion. The frame holds the back portion and the seat portion in position to hold a person, and lower portions of the frame coupled to the at least one set of large rear wheels and the at least one set of small front wheels. In embodiments, wheelchair 34 can be waterproof, or coated in material to prevent weathering, such as thermoplastic or thermoset polymers, i.e. powder-coating. Adjacent the seat portion, a front portion of the frame is connected to attachment mechanism 36. Attachment mechanism 36 is configured to attach to the hook or clasp on the free end of the cable 24, or rope, such that the lift may be used to lower or raise the wheelchair into or out of water 42, respectively.

Figure 5:
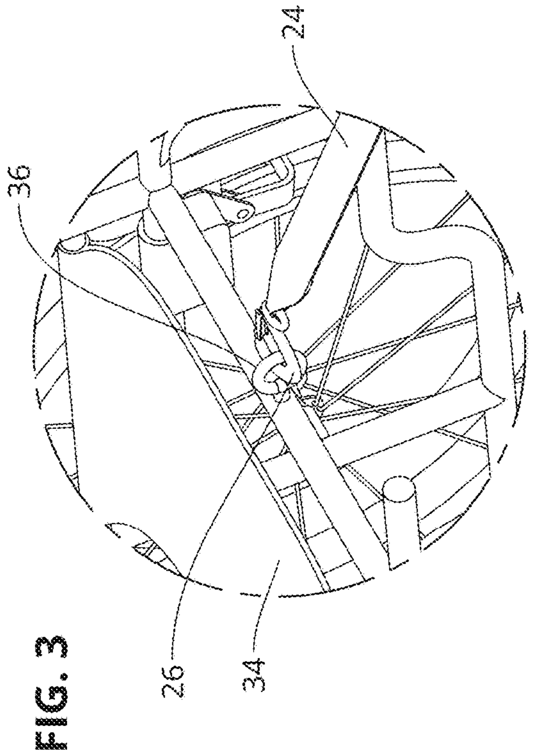
FIG. 5 is a detailed view of an attachment mechanism of the lift device.

Referring now to FIG. 5, aspects of the attachment mechanism 36 are illustrated. In embodiments, wheelchair 34 includes at least one mounting point for attachment mechanism 36. In embodiments, a tube, such as aluminum, steel, or other known material, can be installed below the seat of wheelchair 34 and across the frame to provide the at least one mounting point. In embodiments, the tube can be waterproof or coated in material to prevent weathering, such as thermoplastic or thermoset polymers, i.e. powder-coating. In embodiments, the tube can be installed via welding, or other known mechanisms. Once the tube is installed, attachment mechanism 36 is affixed to the tube. In embodiments, attachment mechanism can be an eye-bolt which can be affixed to an aperture provided in the tube, or can be otherwise affixed to the tube, by known mechanism such as welding, etc. Once installed attachment mechanism 36 provides an interface where fastening element 26 can attach the pulley system to wheelchair 34.

Figure 6:
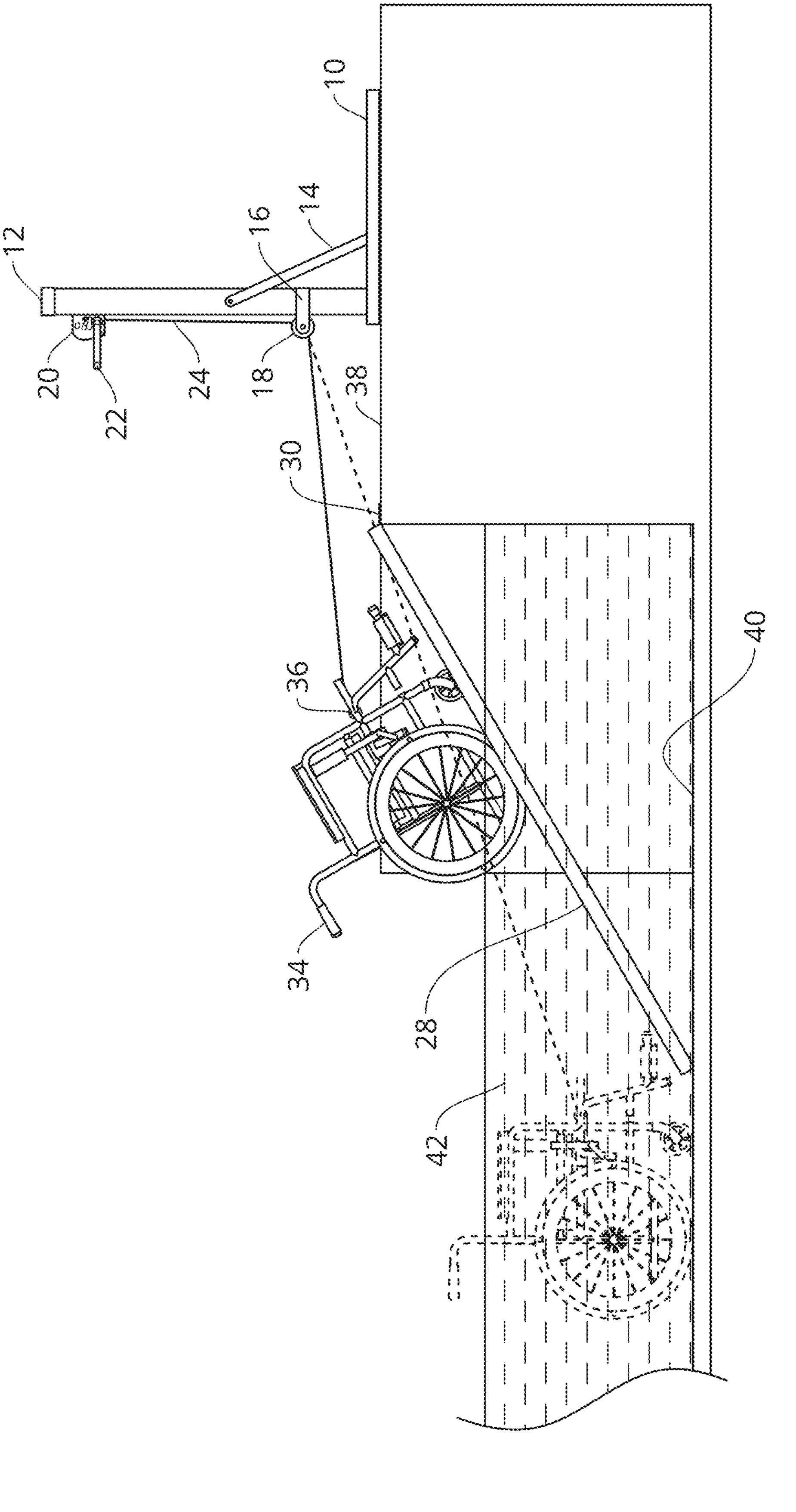
FIG. 6 is an embodiment of a ramp, wheelchair and lift device in operation in accordance with the present invention.

Referring now to FIG. 6, a method of operation of the invention is illustrated. In embodiments, the method comprises placing ramp 28 in water 42 such that the first end is placed securely on pool deck 38 and the second end is placed securely on the floor of the pool 40, or in the alterative such that the lift affixed to the second end is placed securely on the floor of the pool 40. Additionally, base 10 is affixed, or otherwise secured, to pool deck 38, such that the pulley system disposed on post 12 is secure in place.

Once base 10 and ramp 28 are secured, fastening mechanism 26 can be secured to attachment mechanism 36, such that wheelchair 34 is connected to strap 24 of the pulley system. At this point, a first operator may then guide wheelchair 34 and its occupant onto ramp 28 and a second operator may actuate winch 20 to lower wheelchair 34 into the pool by turning winch 20, via handle 22, to extend the cable 24, or rope. The first operator may guide wheelchair 34 down ramp 28 with the aid of guide rails 32. Further, the second operator may stand on the base 10 while operating winch 20 to use their weight to further stabilize the lift during operation, however this is optional as based can be secured by other means (described above). Once wheelchair 34 is submerged in water 42 to a sufficient degree, the occupant may exit wheelchair 34 into the water, with or without assistance from the first operator. In embodiments, submersion to a sufficient degree occurs when wheelchair 34 rests on pool bottom 34, or alternatively is at the bottom end of ramp 28.

To pull the wheelchair out of the pool, attachment mechanism 36 may again be attached to fastening mechanism 26 on the free end of the cable 24, or rope, and wheelchair 34 may be guided onto the second end of the ramp 28, and winch 20 may be turned by the second operator to retract the cable 24, or rope. The first operator may again help guide wheelchair 34 and its occupant along the ramp with the aid of ramp's guide rails 32.

The present invention thus provides an easy to use and electricity free portable device and method for transferring handicapped or disabled persons into or out of a swimming pool. By doing so, the present invention grants more people greater access to swimming pools at a fraction of the cost of conventional lift systems.

While the present invention has been discussed in terms of aiding handicapped or disabled persons to enter or leave a swimming pool, the present invention may additionally be used where the raising or lowering of large or heavy objects is desired. For example, the present invention may be used to launch small boats, for loading trucks, for raising or lowering animals, among other potential uses.

It should be understood, of course, that the foregoing relates to exemplary embodiments of the invention and that modifications may be made without departing from the spirit and scope of the invention as set forth in the following claims.

What is claimed is:

1. A device for transferring a user into a pool, comprising:
- a pulley system, comprising:
  - a base;
  - a post affixed to the base;
  - at least one winch affixed to the post; and
  - a cable disposed on the at least one winch and having a fastening means affixed to an end of the cable, wherein the at least one winch is configured to spool or unspool the cable when actuated;
- a mobile chair comprising:
  - a frame;
  - a seat affixed to the frame;
  - a plurality of wheels affixed to the frame; and
  - at least one attachment means affixed to the frame, the at least one attachment means configured to attach to the fastening means; and
- a ramp, comprising:
  - a body;
  - a front lip formably affixed to the body; and
  - a plurality of guide rails formably affixed to the body.

2. The device of claim 1, wherein the pulley system further comprises:
- at least one pulley wheel affixed to the post, the pulley wheel configured to rotate freely on an axis perpendicular to the post, wherein the cable contacts the at least one pulley wheel.

3. The device of claim 1, wherein the fastening means is a hook or clasp.

4. The device of claim 1, wherein the attachment means is an eyebolt.

5. The device of claim 1, wherein the front lip comprises a plurality of flanges angling from the body.

6. The device of claim 1, wherein the base includes a recessed portion configured to accept the post.

7. The device of claim 1, further comprising: a plurality of supports, each of the plurality of support affixed at a first end to the base, and at a second end to the post.

8. A device for transferring a user into a pool, comprising:
- a pulley system comprising:
  - a base having a top surface, a bottom surface, and a plurality of side surfaces;
  - a post having a top surface, a bottom surface, and a plurality of side surfaces;
  - a winch mounted to a first of the plurality of side surfaces of the post proximate to the top surface of the post;
  - at least one pulley wheel mounted below the winch proximate to the bottom surface of the post, wherein a mounting bracket of the at least one pulley wheel is at least partially affixed to the first side surface of the plurality of side surfaces of the post, the at least one pulley wheel configured to rotate freely on an axis perpendicular to the post; and
  - a cable disposed on the at least one winch and in contact with the at least one pulley wheel and having a clasp, or hook, affixed to an end of the cable, wherein the at least one winch is configured to spool or unspool the cable when actuated;
- a mobile chair, comprising:
  - a frame;
  - a seat affixed to the frame;
  - a plurality of wheels affixed to the frame; and
  - at least one eyebolt affixed to the frame, the at least one eyebolt configured to attach to the clasp, or hook; and
- a ramp, comprising:
  - a body, having a top surface, a bottom surface, and a plurality of side surfaces;
  - a plurality of flanges formably affixed to a first side surface of the ramp, the plurality of flanges forming a reflex angle with the top surface of the body; and
  - a first guide rail formably affixed to a second side surface of the body and protrudes in a direction normal to the top surface of the body; and
  - a second guide rail formably affixed to a third side surface of the body and protrudes in a direction normal to the top surface of the body.

* * * * *